Jan. 24, 1950     M. GRUNT     2,495,373
FITTING FOR CONNECTING TUBES AND PIPES TO TANKS
Filed Dec. 5, 1947
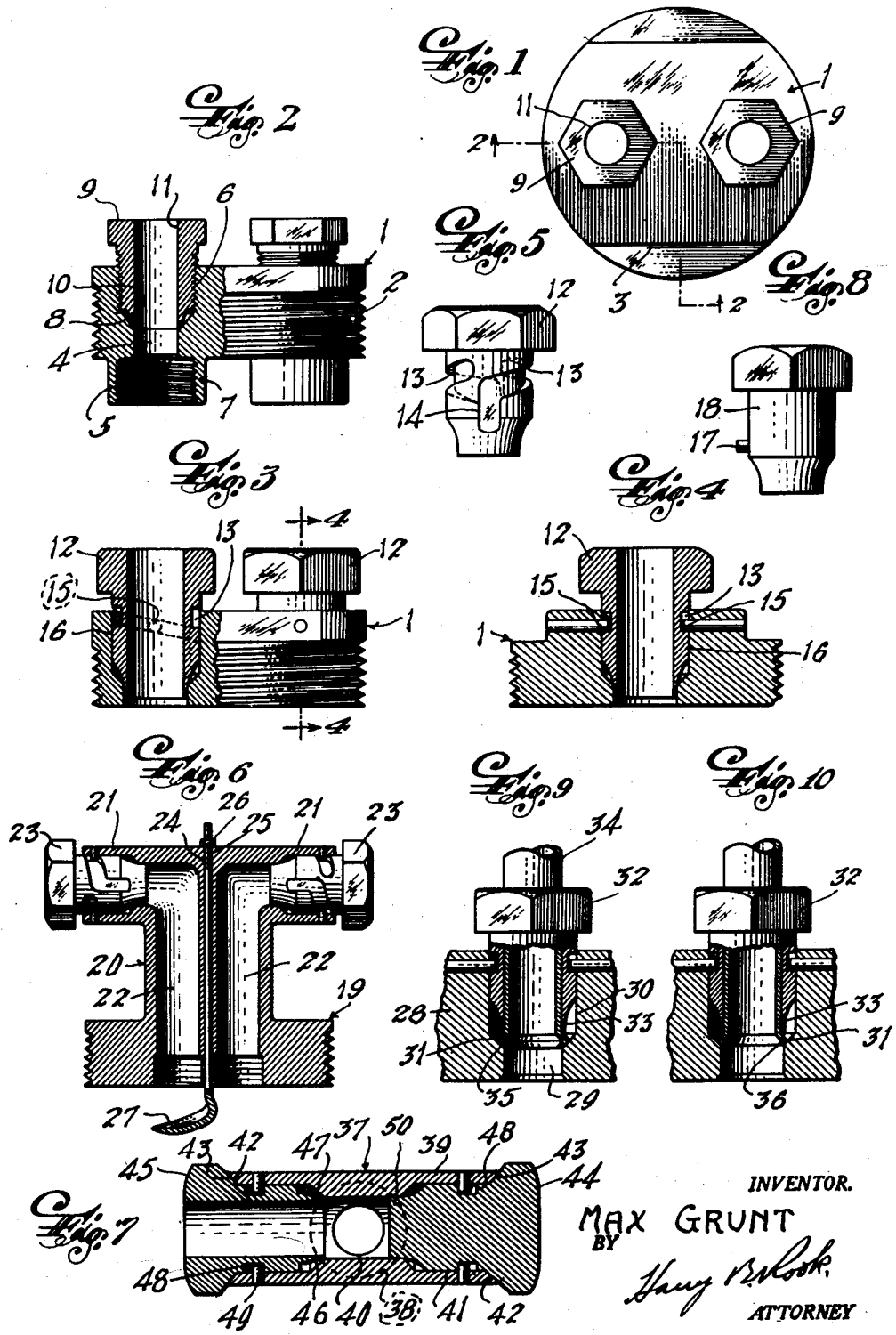
INVENTOR.
MAX GRUNT
ATTORNEY Patented Jan. 24, 1950

2,495,373

UNITED STATES PATENT OFFICE 2,495,373

FITTING FOR CONNECTING TUBES AND PIPES TO TANKS

Max Grunt, Newark, N. J.

Application December 5, 1947, Serial No. 789,813

2 Claims. (Cl. 285—205)

1

This invention relates in general to a fitting for connecting tubes and pipes to tanks, and more particularly the invention contemplates such a fitting especially adapted for use with fuel supply tanks for oil burners.

According to general practice, oil tanks, particularly those buried in the ground, have a plurality of threaded openings in their upper sides to each of which one of the oil supply, oil return, filling and vent pipes are connected, and one object of my invention is to provide a fitting which shall make it easy and simple to connect two tubes or pipes to a single opening in the tank, thereby reducing the number of openings required in the tank and also facilitating the connection of the pipes to the tank.

Another object is to provide a fitting which will permit the running of a single copper tube from, for example, an oil burner pump to the bottom of the fuel tank, and will also allow for connection to the fitting of a threaded pipe, for example, an iron pipe, to extend downwardly into the tank and in which said tube may be located so that it will be housed and protected against bending.

Other objects are to provide a fitting of the general character described which shall include novel and improved means for easily and quickly making a fluid-tight connection of copper tubing to the fitting without the use of packing, and to obtain other advantages and results that will be brought out by the following description when read in conjunction with the accompanying drawings, in which Figure 1 is a top plan view of a fitting embodying my invention;

Figure 2 is a vertical sectional view, approximately on the plane of the line 2—2 of Figure 1;

Figure 3 is a view similar to Figure 2, showing a modification of the invention;

Figure 4 is a vertical sectional view, approximately on the plane of the line 4—4 of Figure 3;

Figure 5 is a detached perspective view of one of the coupling nuts shown in Figures 3 and 4;

Figure 6 is a vertical sectional view through a modified form of the fitting;

Figure 7 is a longitudinal sectional view through another form of fitting;

Figure 8 is a detached side elevational view of a modified form of coupling nut;

Figure 9 is a fragmentary view similar to Figure 3, showing a modified manner of connecting a copper tube to the fitting; and Figure 10 is a similar view showing another modification.

2

Specifically describing the embodiment of the invention shown in Figures 1–5, inclusive, the reference character 1 designates a cylindrical fitting which is exteriorly screw threaded at 2 to adapt the fitting to be screwed into a correspondingly threaded opening in a tank, the fitting having opposed flat surfaces 3 for the application of a wrench to rotate the fitting.

Extending transversely through the fitting are a plurality of openings 4 opposite end portions of which are enlarged to the same diameter and correspondingly screw threaded, as indicated at 5 and 6. Preferably, the enlarged portions 5 at the bottom of the fitting are formed in extensions 7 of the fitting so as to reduce the thickness and weight of the unit. With this construction, correspondingly threaded pipes could be screwed into each of the threaded portions 5 and 6, if desired.

To permit the connection of copper tubing or the like to one end of each opening 4, a beveled seat 8 is formed at the inner end of each of the enlarged portions 6 and an exteriorly threaded bushing 9 is screwed into said portion 6 of the opening and has an annular coaxial tapered flange 10 at its inner end. In use, the copper tubing to be connected to the fitting has one end portion inserted through the opening 11 in the bushing 9 to a point beyond the seat 8, and thereupon the bushing is screwed into the opening so that the flange 10 is deflected by the beveled seat 8 into fluid-tight contact with the copper tube.

While I have shown two openings 4, obviously the number of openings may be varied as desired, consistently with the diameter of the fitting.

As shown in Figures 3 and 4, the extensions 7 and the threaded inner end portions of the openings through the fitting may be omitted, and instead of the screw threaded bushing 9, a quickly attachable and detachable bushing 12 may be utilized. This bushing has helical grooves 13 of long pitch and opening through the inner end of the bushing at diametrically opposite points, as at 14, to cooperate with studs or pins 15 projecting into the opening 16 and fitting. Assuming the bushing to be detached from the fitting, to attach it, the ends 14 of the grooves 13 are lined up with the respective studs 15 and pushed inwardly of the opening 16, whereupon the bushing is turned so as to lock it in the fitting.

If desired, a stud or pin 17 may be placed in a bushing 18, as indicated in Figure 8, to cooperate with a helical groove in the walls of the opening in the fitting.

Figure 6 shows another form of fitting which includes a cylindrical and exteriorly threaded base portion 19 and an upwardly extending stem portion 20 terminating in oppositely directed arms 21. A pair of ducts 22 extend through the base portion 19 and the stem portion 20, one of the ducts opening through the end of the arms 21. A bushing 23 similar to that shown in Figure 3 is fitted into the outer end of each of the ducts. Extending through the stem and beyond the base portion 19 is a volume-adjusting device that includes a shank 24 longitudinally adjustable through an opening 25 in the stem by a nut 26 screwed on the upper end of the shank, there being a spoon-like projection 27 on the other end of the shank partially overlying the end of one of the ducts 22. By adjusting the portion relative to the duct 22, the volume of liquid passing through the duct may be controlled.

A further modification of the invention is shown in Figure 9, where the fitting 28 has an opening 29 corresponding to the opening 4, one end portion of which is enlarged at 30 to form a beveled seat 31. A bushing 32 like that shown in Figure 3 is mounted in the fitting and its inner end has a thin annular lip 33 to cooperate with a copper tube 34 to provide a fluid-tight connection of the tube to the fitting. In connecting the tube to the fitting, the tubing is slipped through the bushing 32 and an expanding tool is forced into the end of the tube through the opening 29 to upset or expand the extremity of the tubing and form a crimp 35 therein to engage the seat 31. Then the bushing 32 is tightened in the opening so as to clamp the crimped portion 35 into fluid-tight contact with the seat, the thin lip 33 being slightly yieldable during this operation.

A similar construction is shown in Figure 10, where instead of simply expanding the end of the tubing, it is flared outwardly to form a flange 36 to abut the beveled seat 31.

There are many uses for fittings of the type hereinbefore described, and the fitting is particularly advantageous in connection with oil burner installations in that the oil supply tube leading from the tank to the pump can be connected to one of the openings 4 of the fitting while the oil return pipe can be connected to the other opening. In an emergency, in case of a leak in the oil supply pipe, the connections can be reversed so that the oil return pipe could be used for supplying oil to the oil burner pump.

In many instances it is desirable to provide a liquid-tight joint between the coupling bushing and the body of the fitting, and where only one of the openings through a fitting is utilized, it is necessary to plug the other opening. In Figure 7 is shown a modification of the invention wherein these purposes are accomplished, and primarily for the purposes of illustrating the principles involved, I have shown a T-fitting 37 which includes a stem portion 38 and oppositely directed branches 39 that lead outwardly from a common opening 40 which communicates with the passage through the stem 38, the opening through each of said branches having an enlarged portion 41 coaxial with the main opening 40. At its extremity, each branch has a beveled, preferably ground, seat 42 to cooperate with a correspondingly beveled shoulder 43 on a plug 44 or a coupling bushing 45, as the case may be. The bushing 45 is adapted to have inserted therein a copper tube or the like for connecting the tube to the fitting and the inner end of the bushing has a tapered coaxial annular flange 46 to cooperate with a beveled seat 47 at the inner end of the enlarged portion 42 of the opening so that said flange is pressed into fluid-tight contact with a tube inserted into the bushing in the same manner as hereinbefore described in connection with Figure 1.

The bushing may be secured in the fitting in any suitable manner as by threads, but preferably as shown in Figures 3 and 4, the bushing having helical grooves 48 cooperating with studs 49 projecting into the opening 40. As the plug is turned into the fitting, the tubing will yield sufficiently to permit the beveled shoulders 43 to tightly engage the seat 42 and thereby form a liquid-tight joint between the bushing and the fitting.

Where it is desired to plug one of the openings, the solid plug 44 is used, being connected to the fitting in the same manner as the plug 45 with its shoulder 43 in engagement with the corresponding seat 42, but preferably the inner end of the plug has a reduced coaxial extension 50 which nicely fits the main opening 40 in the fitting, whereby the plug in effect has two seated joints with the fitting, namely the joint 42, 43 and the joint 50, 40.

Obviously, many modifications and changes can be made in the details of construction of the fitting within the spirit and scope of the invention.

Having thus described the invention, what I claim is:

1. A tank fitting comprising a cylindrical exteriorly threaded plug to be screwed into a hole in a tank wall and having a plurality of openings therethrough each to receive a tube, means for anchoring a tube in each opening in fluid tight relation to said plug comprising at least two elements one of which is an annular shoulder fixed with respect to the plug and coaxial with the corresponding opening while the other element is rotatable relatively to the plug and has a bore therethrough coaxial with said shoulder to slidably receive a tube and upon rotation in one direction to cooperate with said shoulder to lock said tube in the plug for producing a fluid tight joint between said plug and said tube.

2. A tank fitting comprising a cylindrical exteriorly threaded plug to be screwed into a hole in a tank wall and having a plurality of openings therethrough at least one opening being internally threaded at its opposite ends to provide for securing an exteriorly threaded element in each end of the opening, a bushing removably screwable into one end of said opening, said bushing and the walls of the opening inwardly of said threaded portion having cooperating means for producing a fluid tight seal between said plug and a tube extending therethrough.

MAX GRUNT.

REFERENCES CITED

The following references are of record in the file of this patent:

UNITED STATES PATENTS

| Number | Name | Date |
|---|---|---|
| 1,065,233 | Gittinger | June 17, 1913 |
| 1,183,354 | Dittman | May 16, 1916 |

FOREIGN PATENTS

| Number | Country | Date |
|---|---|---|
| 569,953 | France | Jan. 12, 1924 |